3,496,495

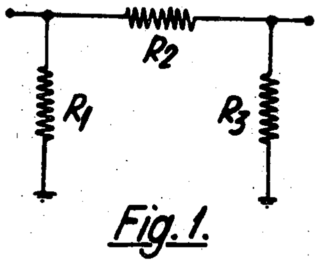
Fig. 1.
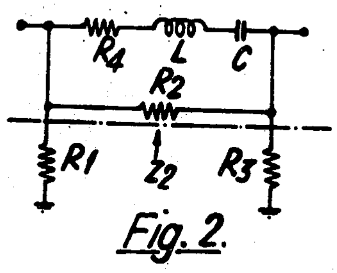
Fig. 2.
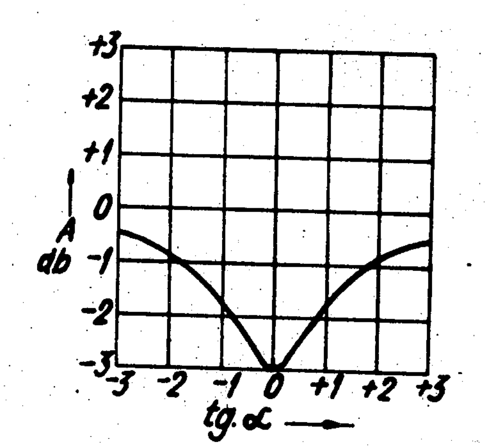
Fig. 3.
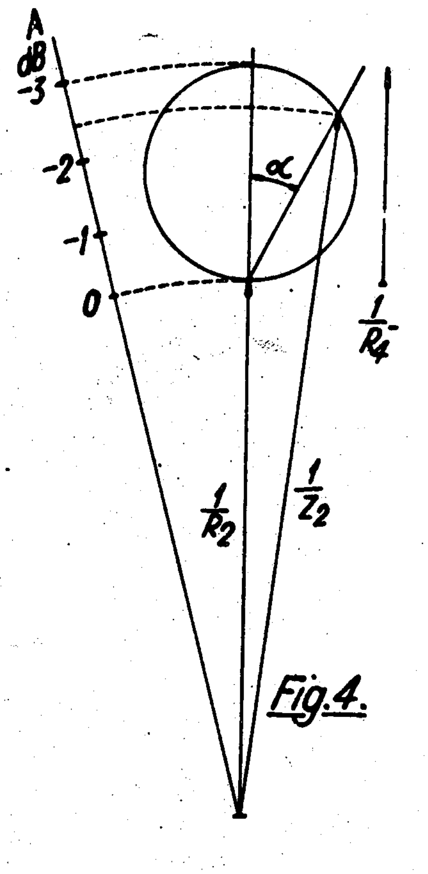
Inventor
BRUNO FABBRI
By D. P. Warner
Attorney United States Patent Office 3,496,495
Patented Feb. 17, 1970

ADJUSTABLE ATTENUATION EQUALIZER HAVING EQUALIZING BRANCHES INDUCTIVELY COUPLED TO THE TRANSMISSION PATH

Bruno Fabbri, Milan, Italy, assignor to International Standard Electric Corporation Filed Dec. 5, 1967, Ser. No. 688,186
Claims priority, application Italy, Dec. 5, 1966, 30,753
Int. Cl. H03h 5/12
U.S. Cl. 333—28 9 Claims

ABSTRACT OF THE DISCLOSURE

An adjustable attenuation equalizer is provided. The equalizer has a separate branch containing resistance and reactive elements for each frequency segment of the band of frequencies to be equalized. Coupling of each branch may be varied both with respect to amplitude and polarity.

This invention relates to electrical equalizing circuits the transmission characteristics of which can be adjusted over a plurality of frequency bands to give a predetermined shape.

Two main types of adjustable equalizers are known. In the first of these, also known as the cosine or transversal equalizer, the signal to be equalized is applied to the input of a delay line. The output of the delay line is terminated in a matched load in which the signal is absorbed. The delay line is provided with a plurality of pairs of tapping points arranged symmetrically with respect to an intermediate point and arranged so that any two adjacent taps are separated by a fixed distance which corresponds to a $\lambda/2$ of the highest frequency to be equalized, so that at each pair of taps pairs of signals are obtained which are replicas of the input signal, but are displaced relative to the signal at the intermediate tap by a basic delay $\pm\Delta t$. The equalized output signal is obtained by summing the partial signals obtained from the taps after the amplitude of these partial signals is suitably adjusted. In this type of equalizer each pair of partial signals corresponds to a term of a Fourier series and the overall shape of the characteristic is the sum of all the terms. A more complete description of this type of filter is given for example in the article "Transversal Filters" by H. E. Kallmann in the July issue of Proc. I.R.E.

Equalizers of the second known type are made up of a ladder network comprising a plurality of tandem connected constant impedance sections. Each section affects the insertion loss of the equalizer over a particular frequency range by selectively altering the dissipation of the signal by two resistive parameters.

Both known types of equalizers suffer from the disadvantage of introducing into the transmission path a relatively high loss. In the cosine type equalizer this is due to the fact that the extraction of the partial signals must not affect the propagation of the signal in the delay line i.e. only a small fraction of the input signal can be extracted at each tap. In the ladder type equalizer the basic loss introduced by each section is at least equal to the magnitude of required equalization. If, for example, each section is required to introduce 3 db of equalization, a 25 section equalizer will have a basic loss of 75 db.

According to the invention there is provided an adjustable attenuation equalizer circuit for connection between a signal source and a load circuit comprising for each frequency segment of the band of frequencies to be equalized a branch coupled to the transmission path between the source and the load, each branch including a resistive and a reactive element of fixed value, the degree and sign of equalization in each frequency segment being adjusted by varying the magnitude and sign of coupling of each branch to said transmission path.

The invention will now be described with reference to the accompanying drawings in which:

FIGS. 1 and 2 are diagrams to explain the design of the equalizer according to the invention.

FIGS. 3 and 9 are characteristic curves.

FIGS. 4 and 8 are vector diagrams.

FIG. 1 shows a resistive attenuation pad in $\pi$ configuration comprising shunt resistors $R_1$ and $R_3$ and a series resistor $R_2$. A source of signal and a load circuit, not shown, are connected across $R_1$ and $R_3$ respectively. If, as shown in FIG. 2, a circuit comprising a resistor $R_4$, an inductor L and capacitor C is bridged across the series arm $R_2$ of the pad, the insertion loss of the circuit of FIG. 2 will differ from that of FIG. 1 by the amount shown by the inverted bell shaped curve of FIG. 3. In this curve the abscissa represents the frequency of the signal, given in terms of the expression $$\tan \alpha = \frac{\omega L - \frac{1}{\omega C}}{R_4}$$

and the ordinate is scaled in db.

If the simplifying assumption is made that $R_1$ and $R_3$ are each small compared to the impedance $Z_2$, which represents the impedance of the circuit formed by $R_2$, $R_4$, L and C, the values plotted in FIG. 3 can be obtained from the vector diagram of FIG. 4.

Figure 5:
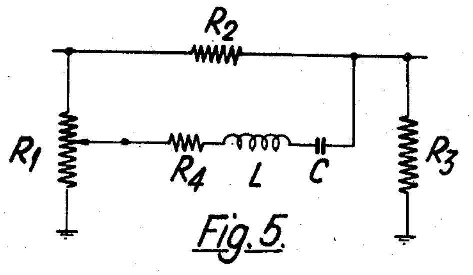
FIGS. 5, 6 and 7 are simplified schematics of equalizers according to the invention.
Figure 6:
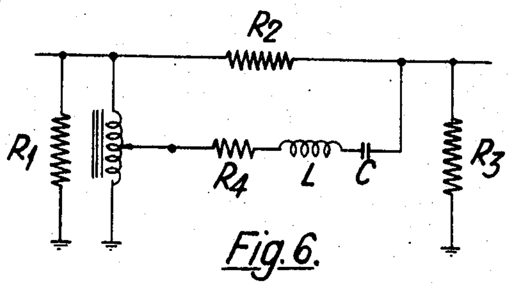

To adjust the magnitude of the dip which occurs at the frequency of resonance of the LC circuit either a resistive or inductive potential divider can be used. The two arrangements are shown in FIGS. 5 and 6. It is apparent that the maximum amount of equalization is obtained when the slider is in its highest position, i.e. at the end of the potential divider nearest to resistor $R_2$. Conversely the amount of equalization is reduced towards zero as the slider is moved towards earth. In the vector diagram of FIG. 4 the movement of the slider is equivalent to varying the length of $1/Z_2$ by an amount equal to twice the radius of the circle.

Figure 7:
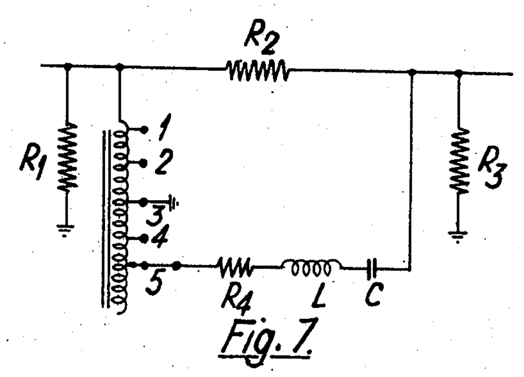

The use of an inductive potential divider has the advantage that it can be used not only as a means of altering the amount of equalization at a given frequency but also enables to alter the sense of equalization, i.e. to give either a peak or a dip. This result is obtained as shown in FIG. 7 by providing the inductive potential divider with a center tap which is connected to earth. Thus when the slider is set to tapping points 1 or 2 the characteristic will have a dip at the resonant frequency of L, C. With the slider at the earthy tapping point 3 the characteristic will be flat. With the slider at tapping points 4 or 5 the characteristic will have a peak.

Figure 8:
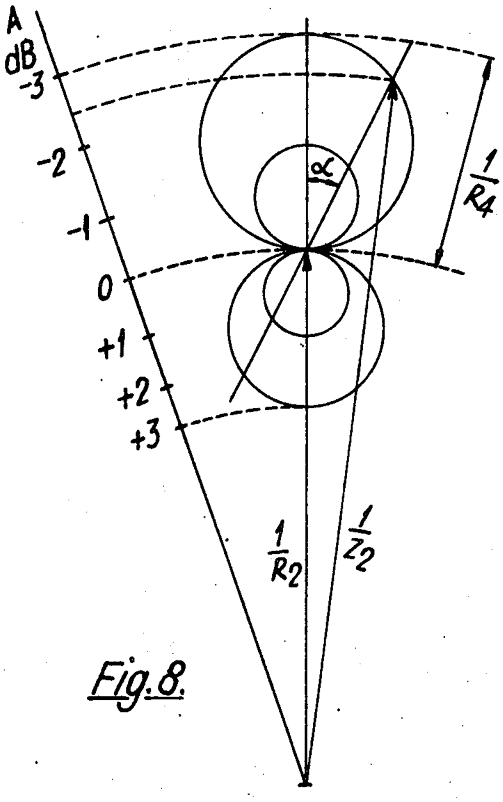
Figure 9:
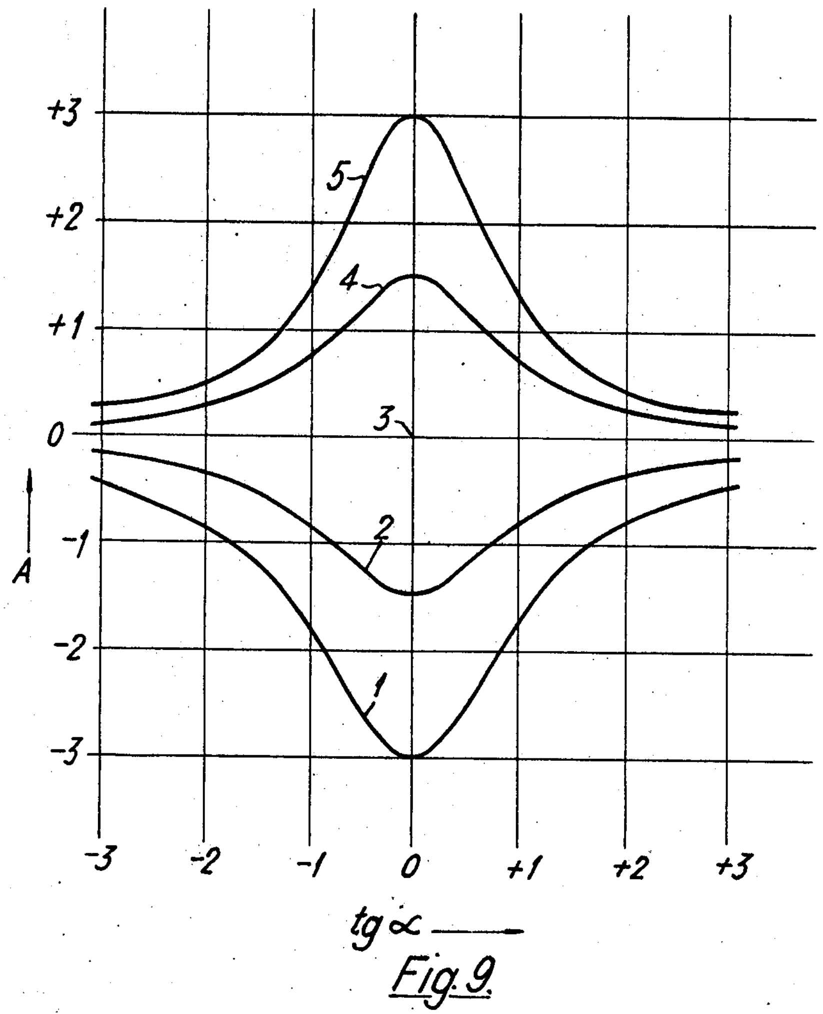

The vector diagram corresponding to the circuit of FIG. 7 is shown in FIG. 8 and the range of characteristics obtainable is shown in FIG. 9. Although in the above example the number of taps on the potential divider was five, any other number can be used.

Figure 10:
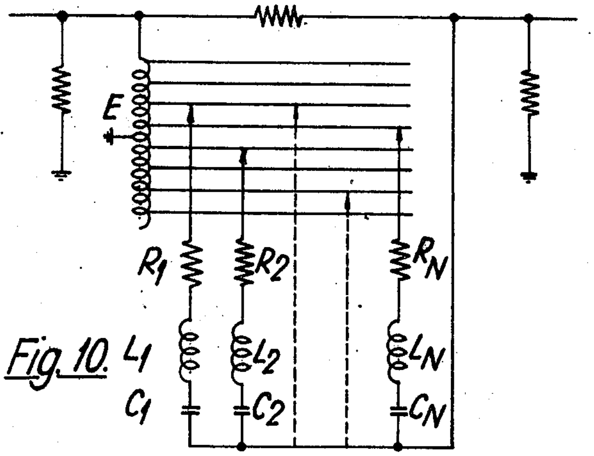
FIGS. 10 to 13 are circuit diagrams of equalizers according to the invention.

A practical embodiment of an equalizer according to the invention to provide a characteristic which can be adjusted over N individual frequency ranges is shown in FIG. 10. Each frequency range for which an adjustment is required is associated with a branch comprising a resistor, inductor and capacitor circuit, the latter being selected to resonate at the center of the respective frequency range. Each branch circuit can be connected to any one tap on the potential divider by means of a selector switch, which for simplicity is indicated in FIG. 10 by a plurality of horizontal lines and arrowheads.

It will be apparent to those skilled in the art that when the equalizer is required to give a characteristic which rises or falls more or less uniformly over the whole band the resonant frequency of one of the LC branches can lie either above or below the frequency band to be equalized. Such a characteristic can be obtained for example by making either L=0 or C=infinity in other words the branch can contain a single reactance, either a capacitor or inductor.

Sometimes it may be required to provide means to adjust the magnitude of the non-selective flat loss introduced by the equalizer. For this purpose a branch circuit may be added which contains only a resistance element.

Figure 11:
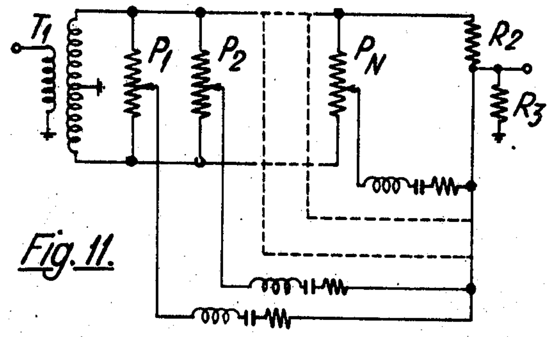

In cases when the requirements on the basic insertion loss are not severe and equalization over relatively few frequency bands is required, the multi-tapped inductive potential divider can be replaced by a transformer $T_1$ which is provided with a center tapped secondary across which a plurality of resistive potential dividers $P_1$ to $P_N$ are provided. This simple arrangement is shown in FIG. 11. The total resistance of the potentiometers is chosen so that their combined resistance, as seen through the primary of transformer $T_1$ has the required value.

Figure 12:
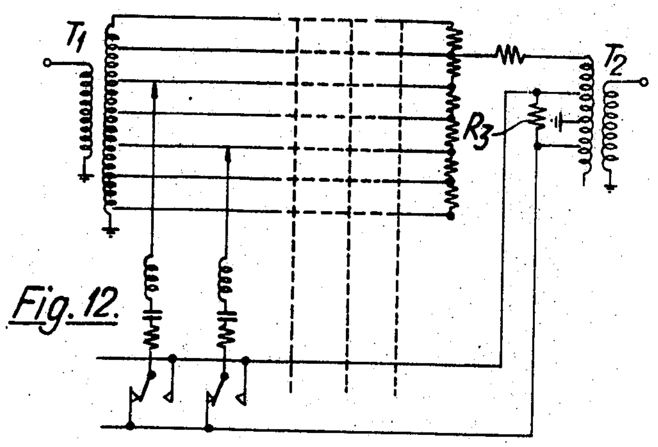

FIG. 12 shows a further modification of the equalizer according to the invention. In this arrangement for each frequency range there are provided two separate controls. The first control is a two position switch which enables one end of an equalizing branch to be connected to one of two taps on transformer $T_2$. This switch determines the sign of equalization. The amount of equalization is set by means of the second control which as in the previous arrangements selects an appropriate tap on transformer $T_1$. The circuit of FIG. 12 has the advantage of providing for a given number of taps on the inductive potential divider twice as many adjustment steps, i.e. a finer adjustment than the previous circuits at the expense of having to use for each frequency range a separate switch.

Figure 13:
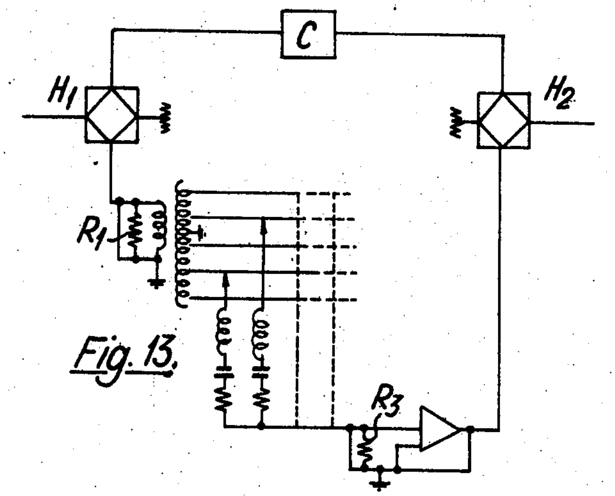

In some instances it is of importance to keep the basic insertion loss of the equalizer as low as possible. In this case the equalizer according to the invention is used in the circuit of FIG. 13. In this arrangement the source and load, not shown, are connected to the equalizer via hybrid networks $H_1$ and $H_2$. These two networks are interconnected by an upper and lower path. The equalizer followed by an amplifier is connected in the latter, and a network C in the former. The network serves a dual purpose. First it takes the place of the series arm $R_2$ of the basic attenuator pad of FIG. 2. Thus in the event of failure of the amplifier in the lower path transmission between source and load are maintained and only equalization is lost. Secondly network C includes a phase shifting network the purpose of which is to give the upper and lower transmission paths identical phase characteristics so that the signals in these paths can be added in hybrid network $H_2$ without introducing phase distortion.

While the principles of the invention have been described above in connection with specific apparatus and applications, it is to be understood that this description is made only by way of example and not as a limitation on the scope of the invention.

I claim:

1. An adjustable attenuation equalizer circuit for connection between a signal source and a load circuit comprising for each frequency segment of the band of frequencies to be equalized a branch coupled to the transmission path between the source and the load, each branch including a resistive and a reactive element of fixed value, the amount and sign of equalization in each frequency segment being adjusted by varying the coupling of each branch to said transmission path, the coupling being varied by adjusting connections to an inductive potential divider having one terminal connected to one end of the path and another terminal to a point of zero potential and having tapping points therebetween.

2. An equalizer as claimed in claim 1 in which each branch is a $\pi$ network, the transmission path is the series arm of the network, in which a first terminal of each branch is connected to one end of said path and in which means are provided to connect a second terminal of each branch to a point having a potential intermediate between the potential of said other end and zero potential.

3. An equalizer as claimed in claim 1 in which the potential divider associated with each branch is resistive and is connected across the secondary winding of a center tapped transformer, having its primary winding connected to the source of signal.

4. An equalizer as claimed in claim 1 in which a capacitor in the reactive element introduces a steadily rising frequency characteristic.

5. An equalizer as claimed in claim 1 in which an inductor in the reactive element introduces a steadily falling frequency characteristic.

6. An equalizer as claimed in claim 1 in which the reactive element in a branch comprises a series resonant circuit tuned to resonate at a frequency falling within the frequency segment to be equalized by that branch.

7. An equalizer as claimed in claim 6 in which the resonant element is tuned to a frequency lying outside the frequency band to be equalized.

8. An equalizer as claimed in claim 6 in which the attenuation frequency characteristic provided by a frequency segment associated with a particular one of the branches is substantially flat when a connection is made to a tap point of zero potential, becomes increasingly bell shaped as connections are made at tap points closer to the second end of the winding and increasingly like an inverted bell when connections are made at tap points closer to the first end of the winding.

9. An equalizer as claimed in claim 8 in which the amount and sign of equalization associated with each branch are selected by means of separate controls.

References Cited

UNITED STATES PATENTS

| | | | |
|---|---|---|---|
| 1,815,241 | 7/1931 | Crisson | 333—28 X |
| 2,229,043 | 1/1941 | Butler | 333—28 X |
| 3,336,539 | 8/1967 | Kwartiroff et al. | 333—28 X |

HERMAN KARL SAALBACH, Primary Examiner

P. L. GENSLER, Assistant Examiner

U.S. Cl. X.R.

333—81